United States Patent Office 3,013,033
Patented Dec. 12, 1961

3,013,033
NOVEL ALKYLATED PREGNADIENES
Alexander L. Nussbaum, Leonia, and Eugene P. Oliveto, Bloomfield, N.J., assignors to Schering Corporation, Bloomfield, N.J., a corporation of New Jersey
No Drawing. Filed Oct. 29, 1958, Ser. No. 770,315
9 Claims. (Cl. 260—397.45)

This invention pertains to a new group of therapeutically active pregnadienes and to methods for their manufacture. In particular, our invention relates to 1,5-pregnadiene-17α,21-diol-3,20-diones which possess a 16-lower alkyl substituent in the α- or β-configuration. These novel compounds are potent anti-inflammatory agents.

Our novel compounds may be represented by the following formula:

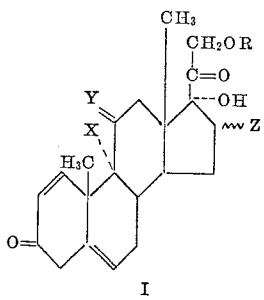

I wherein X is a member of the group consisting of hydrogen and halogen having an atomic weight less than 126; Y is a member of the group consisting of O and (H, βOH); Z is an alkyl radical preferably having from 1 to 4 carbon atoms; and R is a member of the group consisting of H and acyl.

Illustrative of the 21-esters contemplated above are alkanoates such as acetate, propionate, tertiary butylacetate, cyclopentylpropionate, dimethylacetate, trimethylacetate and phenoxyacetate; aryl esters such as benzoate, thiophene carboxylate, nicotinate; esters from dibasic organic esters such as the succinate, phthalate, and the sulfobenzoate; and those from polybasic inorganic acids such as sulfate and phosphate.

Our novel compounds are prepared by subjecting a 16-lower alkyl-1,4-pregnadiene possessing a halogen substituent greater than fluorine at C–6 to the action of zinc in alcohol or magnesium in ether or tetrahydrofuran. By proper control of acidity and solvent polarity, the 1,5-pregnadiene compounds are formed and isolated. Alternatively, the substituent at C–6 may be a pseudohalogen such as tosylate or mesylate or a lower alkanoyloxy group like acetoxy or propionoxy. When the reactive group in the 6-position is halogen or tosylate, the reaction towards formation of the 1,5-dienes may proceed smoothly at room temperature. With a mesylate or lower alkanoyl ester in the 6-position, higher temperatures in the range of 50–100° C. are preferred to effect the transformation since at lower temperatures the reaction proceeds quite slowly.

The starting materials, that is, the 16-lower alkyl-1,4-pregnadienes are preferably prepared as described in copending application Serial No. 733,843 of Rausser et al., filed May 8, 1958. Introduction of the halogeno, pseudohalogeno or acyloxy substituent at C–6 is carried out by any one of several methods. For example, allylic halogenation of a 3-keto-16-alkyl-1,4-pregnadiene with a reagent such as N-bromosuccinimide, N-bromoacetamide, N-chlorosuccinimide, bromine or chlorine in such solvents as dimethylsulfoxide or dioxane yields the corresponding 6-halogeno-16-alkyl-1,4-pregnadiene. Esterification of a 6-hydroxy-16-alkyl-1,4-pregnadiene can be made to yield the tosylate or mesylate or lower alkanoate intermediates. These 6-hydroxy-16-alkyl-1,4-pregnadiene starting compounds are prepared by subjecting a 6-desoxy-16-alkyl-1,4-pregnadiene to the microbiological oxygenating action of an organism of the genus Chaetomium according to the analogous procedure described in Belgian Patent No. 548,450.

Prior to introducing a substituent to the 6-position of a 16-alkyl-1,4-diene so as to prepare the immediate precursor of the compounds of our invention, we prefer to esterify any reactive hydroxyl groups which may be present, such as C–11 or C–21. Thus, for example, in preparing 6-bromo-16α-methylprednisone for ultimate conversion into 16α-methyl-1,5-pregnadiene-17α,21-diol-3,11,20-trione, we prefer to employ a 21-ester of 16α-methylprednisone, such as the acetate, as the starting substance. In those instances where there is a hydroxyl group at C–11 such as when a 16α-methylprednisolone analog is employed as a starting substance or an intermediate, the conditions required for esterification of the C–11 group of necessity esterify both the 17α- and 21-hydroxy groups as well. Thus when preparing a 6-halogeno-16α-methylprednisolone derivative for use as an immediate precursor of a compound of this invention, an 11,17,21-triester such as 16α-methylprednisolone-11,17,21-acetate is employed. It is only in the particular instance where a halogenation step follows that esterification of a C–11 hydroxyl group is advisable. However, if the intermediate being prepared is an ester such as 6-alkanoate or a 6-mesylate or a 6-tosylate, then it is only necessary to protect the hydroxyl group at C–21, since the esterification at C–6 can be carried out selectively in the presence of both an 11- and 17-hydroxyl group.

It is apparent that the 16-alkyl-1,5-pregnadiene obtained will of necessity contain the original ester protective groupings. These ester groups may be conveniently hydrolyzed either chemically by the use of dilute acid or microbiologically by means of *Flavobacterium dehydrogenans* according to analogous procedures described in South African Patent No. 3,462/55. The polyhydroxy-1,5-pregnadiene thus obtained may be selectively esterified at C–21 by methods well known in the art.

Alternatively, saponification of the protective ester groups may be carried out immediately after introduction of the substituent at C–6 and prior to conversion to a 1,5-diene. This process is applicable only to those methods wherein the intermediary compound contains a halogen at C–6. The saponification of the ester may be effected by means of a strong acid such as sulfonic, perchloric, or p-toluenesulfonic in aqueous alcohol. By way of example, 16α-methylprednisone is esterified to yield 16α-methylprednisone 21-acetate, whereupon bromine is introduced at C–6. The 6-bromo-16α-methylprednisone 21-acetate may be saponified to form 6-bromo-16α-methylprednisone which is then converted into the Δ$^{1,5}$-analog by reacting said 6-bromo-16α-methylprednisone with zinc in alcohol yielding 16α-methyl-1,5-pregnadiene-17α,21-diol-3,11,20-trione.

Our process is applicable in general to the conversion of 16-lower alkyl-1,4-pregnadienes to 16-lower alkyl-1,5-pregnadienes provided the starting 16-alkyl steroid contains also a 3-keto-Δ$^{1,4}$-moiety. Thus the preparation of 3-keto-9α,11β-dihalogeno-16-alkyl-1,5-pregnadienes from the corresponding 3-keto-9α,11β-dihalogeno-16-alkyl-1,4-pregnadienes may be effected. Specifically, 9α,11β-dichloro-16α-methyl-11-desoxyprednisone 21-acetate (prepared according to co-pending application, Serial No. 743,492, now Patent No. 2,894,963, filed June 20, 1958) is brominated to the requisite intermediate, 6-bromo-9α,11β-dichloro-16α-methyl-11-desoxyprednisone 21-acetate, which, when reacted with zinc in alcohol, is convertible to 9α-11β-dichloro-16α-methyl-1,5-pregnadiene-17α,21-diol-3,20-dione 21-acetate.

The 9,11-dihalogeno-16-alkyl-1,5-pregnadienes thus prepared by our process are potent anti-inflammatories, being particularly useful in topical administration.

Our novel 16-alkylated-1,5-pregnadienes are potent anti-inflammatory agents which are devoid of sodium or water retaining properties even when administered in large doses. It has been found that shifting the $\Delta^4$-bond of prednisone or prednisolone gives rise to agents which exhibit a decrease in nitrogen, calcium and phosphorous loss, sodium and water retention, and exhibit less increase in fasting blood sugar than occurs with administration of the 1,4-diene. Thus, although the side effects of prednisone and prednisolone are diminished by shifting the $\Delta^4$-bond to C–5, these effects are still present. We have discovered that the introduction of the 16-alkyl group into a 1,5-diene completely eliminates the residual salt and water retaining properties of the substance, while simultaneously retaining the other advantageous properties, i.e. lower nitrogen, calcium and phosphorous loss and less increase in fasting blood sugar. Thus, since our novel compounds exhibit no water or sodium retention, they may be taken in large doses if necessary, providing for anti-inflammatory action without being concerned with edematous effect.

Our therapeutically valuable compounds are preferably administered orally in the form of tablets containing, for example about 2 to 10 mg. per tablet mixed with a solid carrier containing one or more of the usual excipients such as starch, sugar, gums, soaps, clays and the like. Where parenteral administration is indicated, subcutaneous or intramuscular injection of a 21-lower alkanoyl ester dissolved or suspended in a suitable nontoxic liquid vehicle is preferred. In the treatment of skin conditions such as atopic dermatoses, topical preparations such as containing 2–5% of active ingredient are advantageously employed. In some instances, such as direct treatment of an inflamed joint, crystalline suspensions are injected intra-articularly. These microcrystalline suspensions are adaptable for use in nasal sprays as well.

All the compounds of our invention are valuable therapeutic agents as outlined above. The preferred embodiment of our invention, however, are the 16α-methyl and 16β-methyl-1,5-pregnadienes falling within Formula I, particularly the 9α-fluoro analogs of these 16-methyl-1,5-pregnadienes.

The present invention is a continuation-in-part of our co-pending application Serial No. 725,521 filed April 1, 1958, now abandoned.

The following examples are illustrative of the procedure employed in preparing the compounds of this example, but are not to be construed as limiting the scope thereof; the scope of our invention being limited only by the appended claims.

EXAMPLE 1

*9α-fluoro-16α-methyl-11β,17α,21-trihydroxy-1,5-pregnadiene-3,20-dione 21-acetate*

A. 6β-BROMO-9α-FLUORO-16α-METHYL-11β,17α,21-TRIHYDROXY-1,4-PREGNADIENE-3,20-DIONE 21-ACETATE

The requisite starting material, 9α-fluoro-16α-methyl-11β,17α,21-trihydroxy-1,4-pregnadiene-3,20-dione 21-acetate, is prepared by the process described in co-pending application Serial No. 733,843 of Rausser et al., filed May 8, 1958.

9α-fluoro-16α-methyl-11β,17α,21-trihydroxy-1,4-pregnadiene-3,20-dione 21-acetate (380 mg.) is dissolved in 45 ml. of dioxane and then 165 mg. of bromine in 20 ml. of dioxane is added to the stirred solution at room temperature. After the color is completely discharged, agitation is continued for another ten minutes before pouring the solution into 500 ml. of ice-water. The precipitate which thus forms is filtered and air dried, and is substantially 6β-bromo-9α-fluoro-16α-methyl-11β,17α,21-trihydroxy-1,4-pregnadiene-3,20-dione 21-acetate. This product is used without further purification in the following procedure.

B. 9α-FLUORO-16α-METHYL-11β,17α,21-TRIHYDROXY-1,5-PREGNADIENE-3,20-DIONE 21-ACETATE

6β-bromo-9α-fluoro-16α-methyl-11β,17α,21-trihydroxy-1,4-pregnadiene-3,20-dione 21-acetate, prepared in above Example 1A, is dissolved in 100 ml. of ethanol to which 15 ml. of water is added and the resulting solution is heated to reflux temperature. Zinc powder (1.5 g.) is then added and the refluxing suspension is stirred for 1.5 hours, cooled and filtered. The filtrate is concentrated to dryness in vacuo, and chromatographed over 30 g. of Florisil. The fractions eluted with benzene-ether (3:1) give 9α,-fluoro-16α-methyl-11β,17α,21-trihydroxy-1,5-pregnadiene-3,20-dione 21-acetate.

EXAMPLE 2

*9α-fluoro-16α-methyl-11β,17α,21-trihydroxy-1,5-pregnadiene-3,20-dione*

The 16α-methyl-1,5-pregnadiene 21-acetate prepared in above Example 1 is hydrolyzed to the corresponding 21-hydroxy compound with the aid of a culture of *Flavobacterium dehydrogenans* (Rutgers University Collection No. 130).

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

| | Grams |
|---|---|
| Yeast extract (Difco) | 10 |
| Potassium phosphate monobasic | 4.48 |
| Sodium phosphate dibasic | 4.68 |
| Tap water to 1 liter. | |

This culture medium has previously been autoclaved, at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 9α-fluoro-16α-methyl-11β,17α,21-trihydroxy-1,5-pregnadiene-3,20-dione 21-acetate dissolved in a minimum volume of ethanol. The reaction mixtures are then shaken at 30° C. for 12 to 72 hours. The reaction is stopped when paper chromatography indicates that there is no more starting material.

The contents of the flasks are combined and extracted with methylene chloride. The extracts are concentrated and the residue is crystallized from acetone-hexane yielding 9α-fluoro-16α-methyl-11β,17α,21-trihydroxy-1,5-pregnadiene-3,20-dione.

EXAMPLE 3

*9α-fluoro-16β-methyl-11β,17α,21-trihydroxy-1,5-pregnadiene-3,20-dione 21-acetate*

A. 6β-BROMO-9α-FLUORO-16β-METHYL-11β,17α,21-TRIHYDROXY-1,4-PREGNADIENE-3,20-DIONE 21-ACETATE

The requisite intermediate, 9α-fluoro-16β-methyl-11β,17α,21-trihydroxy-1,4-pregnadiene-3,20-dione 21-acetate, is prepared by the process described in co-pending application Serial No. 733,843 of Rausser et al., filed May 8, 1958.

9α-fluoro-16β-methyl-11β,17α,21-trihydroxy-1,4-pregnadiene-3,20-dione 21-acetate (380 mg.) is brominated and the resulting product isolated in the manner described in Example 1A to give 6β-bromo-9α-fluoro-16β-methyl-11β,17α,21-trihydroxy-1,4-pregnadiene-3,20-dione 21-acetate.

B. 9α-FLUORO-16β-METHYL-11β,17α,21-TRIHYDROXY-1,5-PREGNADIENE-3,20-DIONE 21-ACETATE

The 6β-bromo-9α-fluoro-16β-methyl-1,4-pregnadiene of above Example 3A is reacted with zinc powder in ethanol-water in the manner of Example 1B, and the resulting product purified in the described manner to give 9α-fluoro-16β-methyl - 11β,17α,21 - trihydroxy-1,5-pregnadiene-3,20-dione 21-acetate.

EXAMPLE 4

*9α-fluoro-16β-methyl-11β,17α,21-trihydroxy-1,5-pregnadiene-3,20-dione*

The 16β-methyl-1,5-pregnadiene 21-acetate of above Example 3B is converted to the corresponding 21-alcohol with the aid of a culture of *Flavobacterium dehydrogenans* in the manner described in Example 2 yielding 9α-fluoro-16β-methyl - 11β,17α,21 - trihydroxy-1,5-pregnadiene-3,20-dione.

Alternatively, the 16β-methyl-11β,17α,21-trihydroxy-1,5-pregnadiene of this example may be prepared as follows:

507 mg. of 6β-bromo-9α-fluoro-16α-methyl-11β,17α,21-trihydroxy - 1,4 - pregnadiene-3,20-dione 21-acetate (prepared as in Example 1A) is dissolved in 25 ml. of ice-cold ethanol containing 2.5 ml. of water and 65 mg. of sodium hydroxide. The solution is stirred under nitrogen at 0° C. for fifteen minutes, then neutralized with acetic acid and concentrated in vacuo almost to dryness to yield a residue of substantially 6β-bromo-9α-fluoro-16β-methyl-11β,17α,21-trihydroxy - 1,4-pregnadiene-3,20-dione. To this 6β-bromo residue there is added ice-water and ethanol and the solution is reacted with zinc in the manner of Example 1B to give 9α-fluoro-16β-methyl-11β,17α,21-trihydroxy - 1,5 - pregnadiene-3,20-dione.

EXAMPLE 5

*9α-chloro-16α-methyl-11β,17α,21-trihydroxy-1,5-pregnadiene-3,20-dione*

A. 6β-BROMO-9α-CHLORO-16α-METHYL-11β,17α,21-TRIHYDROXY-1,4-PREGNADIENE-3,20-DIONE 21-ACETATE

The requisite intermediate, 9α-chloro-16α-methyl-11β,17α,21-trihydroxy-1,4-pregnadiene-3,20-dione 21-acetate, is prepared in the manner described in co-pending application Serial No. 733,843 of Rausser et al., filed May 8, 1958.

9α-chloro-16α-methyl-11β,17α,21-trihydroxy-1,4 - pregnadiene-3,20-dione 21-acetate is brominated, and the resulting product isolated in the manner of Example 1A to give 6β-bromo-9α-chloro-16α-methyl-11β,17α,21 - trihydroxy-1,4-pregnadiene,3,20-dione 21-acetate.

B. 9α-CHLORO-16α-METHYL-11β,17α,21-TRIHYDROXY-1,5-PREGNADIENE-3,20-DIONE 21-ACETATE

The 6β-bromo-pregnadiene- of above Example 5A is reacted with zinc and aqueous ethanol in the manner of Example 1B, and the resulting product isolated to give 9α-chloro - 16α-methyl - 11β,17α,21 - trihydroxy-1,5-pregnadiene-3,20-dione 21-acetate.

C. 9α-CHLORO-16α-METHYL-11β,17α,21-TRIHYDROXY-1,5-PREGNADIENE-3,20-DIONE

The 21-acetate of the 9α-chloropregnadiene prepared in above Example 5B is converted to the corresponding 21-hydroxy with the aid of a culture of *Flavobacterium dehydrogenans* to yield 9α-chloro-16α-methyl-11β,17α,21-trihydroxy-1,5-pregnadiene-3,20-dione.

Alternatively, the compound of this example may be prepared from 6β-bromo-9α-chloro-16α-methyl-11β,17α,21-trihydroxy-1,4-pregnadiene-3,20-dione 21-acetate (prepared as in Example 5A) in the manner described in the alternative procedure of Example 4 whereby the 21-acetate of the 6β-bromo-1,4-pregnadiene is converted to the corresponding 21-hydroxy which, in turn, is reacted with zinc in ethanol-water to give 9α-chloro-16α-methyl-11β,17α,21-trihydroxy-1,5-pregnadiene-3,20-dione.

EXAMPLE 6

*9α-chloro-16β-methyl-11β,17α,21-trihydroxy-1,5-pregnadiene-3,20-dione*

A. 6β-BROMO-9α-CHLORO-16β-METHYL-11β,17α,21-TRIHYDROXY-1,4-PREGNADIENE-3,20-DIONE 21-ACETATE

The requisite intermediate, 9α-chloro-16β-methyl-11β,17α,21-trihydroxy-1,4-pregnadiene-3,20-dione 21-acetate is prepared according to the procedure described in co-pending application Serial No. 733,843 of Rausser et al., filed May 8, 1958.

The 9α-chloro - 16β-methyl-11β,17α,21-trihydroxy-1,4-pregnadiene-3,20-dione 21-acetate is brominated and the resulting product isolated in the manner of Example 1A to give 6β-bromo-9α-chloro-16β-methyl-11β,17α,21-trihydroxy-1,4-pregnadiene-3,20-dione 21-acetate.

B. 9α-CHLORO-16β-METHYL-11β,17α,21-TRIHYDROXY-1,5-PREGNADIENE-3,20-DIONE 21-ACETATE

The 6β-bromo-9α-chloro-1,4-pregnadiene- of above Example 6A is reacted with zinc powder in ethanol-water in the manner of Example 1B to give 9α-chloro-16β-methyl-11β,17α,21-trihydroxy-1,5-pregnadiene-3,20-dione 21-acetate.

C. 9α-CHLORO-16β-METHYL-11β,17α,21-TRIHYDROXY-1,5-PREGNADIENE-3,20-DIONE

The 21-acetate of the 9α-chloro-16β-methylpregnadiene, prepared in above Example 6B, is converted to the corresponding 21-hydroxy with the aid of a culture of *Flavobacterium dehydrogenans* in the manner of Example 2 to give 9α-chloro-16β-methyl-11β,17α,21-trihydroxy-1,5-pregnadiene-3,20-dione.

Alternatively, the 21-alcohol of this example may be prepared by the alternative procedure of Example 4, whereby the 6β-bromo-9α-chloro-16β-methyl-11β,17α,21-trihydroxy-1,5-pregnadiene-3,20-dione 21-acetate, prepared in Example 6B, is hydrolyzed to the corresponding 21-alcohol which, in turn, is reacted with zinc in ethanol-water to give 9α-chloro-16β-methyl-11β,17α,21-trihydroxy-1,5-pregnadiene-3,20-dione.

EXAMPLE 7

*9α-fluoro-16α-methyl-17α,21-dihydroxy-1,5-pregnadiene-3,11,20-trione*

A. 6β - BROMO - 9α - FLUORO 16α - METHYL - 17α,21 - DIHYDROXY-1,4-PREGNADIENE-3,11,20-TRIONE 21-ACETATE

The requisite intermediate, 9α-fluoro-16α-methyl-17α,21-dihydroxy-1,4-pregnadiene-3,11,20-trione 21-acetate is prepared in the manner described in co-pending application Serial No. 733,843 of Rausser et al., filed May 8, 1958.

9α-fluoro-16α-methyl-17α,21-dihydroxy - 1,4 - pregnadiene-3,11,20-trione 21-acetate is brominated, and the resulting product isolated in the manner described in Example 1A to yield 6β-bromo-9α-fluoro-16α-methyl-17α,21-dihydroxy-1,4-pregnadiene-3,11,20-trione 21-acetate.

B. 9α-FLUORO-16α-METHYL-17α,21-DIHYDROXY-1,5-PREGNADIENE-3,11,20-TRIONE 21-ACETATE

The 6β-bromo-1,4-pregnadiene- of above Example 7A is reacted with zinc powder in aqueous ethanol in the manner of Example 1B and isolated, and purified in the described manner to give 9α-fluoro-16α-methyl-17α,21-dihydroxy-1,5-pregnadiene-3,11,20-trione 21-acetate.

C. 9α-FLUORO-16α-METHYL-17α,21-DIHYDROXY-1,5-PREGNADIENE-3,11,20-TRIONE

The 9α-fluoro-1,5-pregnadiene-21-acetate of Example 7B is converted to the corresponding 21-hydroxy by the action of a culture of *Flavobacterium dehydrogenans* in the manner of Example 2 to yield 9α-fluoro-16α-methyl-17α,21-dihydroxy-1,5-pregnadiene-3,11,20-trione.

Alternatively, the compound of this example may be prepared in the manner described in the alternative procedure of Example 4, whereby 6β-bromo-9α-fluoro-16α-methyl-17α,21-dihydroxy-1,4-pregnadiene-3,11,20 - trione 21-acetate (compound of Example 7A) is first hydrolyzed to the corresponding 21-alcohol, then reacted with zinc to yield 9α-fluoro-16α-methyl-17α,21-dihydroxy-1,5-pregnadiene-3,11,20-trione.

EXAMPLE 8

*9α-fluoro-16β-methyl-17α,21-dihydroxy,1,5-pregnadiene-3,11,20-trione*

A. 6β - BROMO - 9α - FLUORO - 16β - METHYL-17α,21-DIHYDROXY - 1,4 - PREGNADIENE - 3,11,20 - TRIONE 21-ACETATE

The requisite intermediate, 9α-fluoro-16β-methyl-17α,21-dihydroxy-1,4-pregnadiene-3,11,20-trione 21-acetate, is prepared by the process described in co-pending application Serial No. 733,843 of Rausser et al., filed May 8, 1958.

In the manner of Example 1A, 9α-fluoro-16β-methyl-17α,21-dihydroxy-1,4-pregnadiene-3,11,20-trione 21-acetate is brominated and the resulting product isolated to give 6β-bromo-9α-fluoro-16β-methyl-17α-21-dihydroxy-1,4-pregnadiene-3,11,20-trione 21-acetate.

B. 9α-FLUORO–16β-METHYL-17α,21-DIHYDROXY-1,5-PREGNADIENE-3,11,20-TRIONE 21-ACETATE

In the manner of Example 1B, the 6β-bromo-1,4-pregnadiene of above Example 8A is reacted with zinc in aqueous ethanol to give 9α-fluoro-16β-methyl-17α,21-dihydroxy-1,5-pregnadiene-3,11,20-trione 21-acetate.

C. 9α-FLUORO-16β-METHYL-17α,21-DIHYDROXY-1,5-PREGNADIENE-3,11,20-TRIONE

In the manner of Example 2, the 9α-fluoro-16β-methyl-1,5-pregnadiene 21-acetate of Example 8B, is converted to the corresponding 21-alcohol by the action of a culture of *Flavobacterium dehydrogenans* to give 9α-fluoro-16β-methyl-17α,21-dihydroxy-1,5-pregnadiene-3,11,20-trione.

Alternatively, the compound of this example may be prepared by the alternate procedure of Example 4 from 6β-bromo-9α-fluoro-16β-methyl-17α,21 - dihydroxy - 1,5-pregnadiene-3,11,20-trione 21-acetate (the compound of Example 8A) to give 9α-fluoro-16β-methyl-17α,21-dihydroxy-1,5-pregnadiene-3,11,20-trione.

EXAMPLE 9

*9α-bromo-16β-methyl-11β,17α,21-trihydroxy,1,5-pregnadiene-3,20-dione*

A. 6β,9α - DIBROMO - 16β - METHYL - 11β,17α,21 - TRIHYDROXY - 1,4 - PREGNADIENE - 3,20 - DIONE 21-ACETATE

The requisite intermediate, 9α-bromo-16β-methyl-11β,17α,21-trihydroxy-1,4-pregnadiene-3,20-dione 21-acetate, is prepared by the procedure described in co-pending application Serial No. 733,843 of Rausser et al., filed May 8, 1958.

In the manner described in Example 1A, the 9α-bromo-1,4-pregnadiene intermediate of this example is brominated, and the resulting product isolated to give 6β,9α-dibromo - 16β-methyl-11β,17α,21-trihydroxy - 1,4-pregnadiene-3,20-dione 21-acetate.

B. 9α-BROMO-16β-METHYL-11β,17α,21-DIHYDROXY-1,5-PREGNADIENE-3,20-DIONE 21-ACETATE

In the manner of Example 1B, the 6β,9α-dibromo-1,4-pregnadiene of Example 9A, is reacted with zinc in aqueous ethanol and the resulting product isolated and purified in the described manner to give 9α-bromo-16β-methyl-11β,17α,21-trihydroxy-1,5-pregnadiene-3,20 - dione 21-acetate.

C. 9α-BROMO-16β-METHYL-11β,17α,21-TRIHYDROXY-1,5-PREGNADIENE-3,20-DIONE

The 21-acetate of Example 9B is converted to the corresponding 21-alcohol with the aid of a culture of *Flavobacterium dehydrogenans* in the manner of Example 2 to give 9α-bromo-16β-methyl-11β,17α,21-trihydroxy-1,5-pregnadiene-3,20-dione.

Alternatively, the compound of this example may be prepared by the alternative procedure of Example 4 from 6β,9α-dibromo - 16β - methyl - 11β,17α,21-trihydroxy-1,4-pregnadiene-3,20-dione 21-acetate to give 9α-bromo-16β-methyl-11β,17α,21-trihydroxy-1,5-pregnadiene-3,20-dione.

EXAMPLE 10

*9α - bromo - 16α - methyl - 11β,17α,21 - trihydroxy - 1,5-pregnadiene-3,20-dione*

A. 6β,9α-DIBROMO-16α-METHYL-11β,17α,21-TRIHYDROXY-1,5-PREGNADIENE-3,20-DIONE 21-ACETATE

The requisite intermediate, 9α-bromo-16α-methyl-11β,17α,21-trihydroxy-1,4-pregnadiene-3,20-dione 21-acetate is prepared by the process of copending application Serial No. 733,843 of Rausser et al., filed May 8, 1958.

The above bromo intermediate is brominated, and the resulting product isolated in the manner of Example 1A to yield 6β,9α-dibromo-16α-methyl-11β,17α,21-trihydroxy-1,4-pregnadiene-3,20-dione 21-acetate.

B. 9α-BROMO-16α-METHYL-11β,17α,21-TRIHYDROXY-1,5-PREGNADIENE-3,20-DIONE 21-ACETATE

In the manner of Example 1B, the 6β,9α-dibromo-1,4-pregnadiene of Example 10A is reacted with zinc in aqueous ethanol to give 9α-bromo-16α-methyl-11β,17α,21-trihydroxy-1,5-pregnadiene-3,20-dione 21-acetate.

C. 9α-BROMO-16α-METHYL 11β,17α,21-TRIHYDROXY-1,5-PREGNADIENE-3,20-DIONE

The 21-acetate pregnadiene of Example 10B is hydrolized to the corresponding 21-alcohol with the aid of a culture of *Flavobacterium dehydrogenans* in the manner of Example 2 to give 9α-bromo-16α-methyl-11β,17α,21-trihydroxy-1,5-pregnadiene-3,20-dione.

The compound of this example may also be prepared from 6β,9α-dibromo-16α-methyl-11β,17α,21-trihydroxy-1,4-pregnadiene-3,20-dione 21-acetate (the compound of Example 10A by the alternate process of Example 4 yielding 9α-bromo-16α-methyl-11β,17α,21-trihydroxy-1,5-pregnadiene-3,20-dione.

EXAMPLE 11

*9α - bromo - 16α - methyl - 17α,21 - dihydroxy - 1,5 - pregnadiene-3,11,20-trione*

A. 6β,9α-DIBROMO-16α-METHYL-17α,21-DIHYDROXY-1,4-PREGNADIENE-3,11,20-TRIONE 21-ACETATE

The requisite intermediate, 9α-bromo-16α-methyl-17α,21-dihydroxy-1,4-pregnadiene-3,11,20-trione 21-acetate, is prepared according to the procedure in co-pending application Serial No. 733,843 of Rausser et al., filed May 8, 1958.

This intermediate is brominated in the manner of Example 1A and the resulting product isolated in the described manner to give 6β,9α-dibromo-16α-methyl-17α,21-dihydroxy-1,4-pregnadiene-3,11,20-trione 21-acetate.

B. 9α-BROMO-16α-METHYL-17α,21-DIHYDROXY-1,5-PREGNADIENE-3,11,20-TRIONE 21-ACETATE

The dibromide of Example 11A is reacted with zinc in aqueous ethanol in the manner of Example 1B, and the resulting product isolated and purified in the described manner to give 9α-bromo-16α-methyl-17α,21-dihydroxy-1,5-pregnadiene-3,11,20-trione 21-acetate.

C. 9α-BROMO-16α-METHYL-17α,21-DIHYDROXY-1,5-PREGNARIENE-3,11,20-TRIONE

In the manner described in Example 2, the 21-acetate of above Example 11B is hydrolyzed to the corresponding 21-alcohol with the aid of a culture of *Flavobacterium dehydrogenans* to give 9α-bromo-16α-methyl-17α,21-dihydroxy-1,5-pregnadiene-3,11,20-trione.

Alternatively, the compound of this example may be prepared by the alternative process of Example 4 from 6β,9α - dibromo - 16α - methyl - 17α,21 - dihydroxy - 1,4-pregnadiene-3,11,20-trione 21-acetate.

EXAMPLE 12

*9α - bromo - 16β - methyl - 17α,21 - dihydroxy - 1,5-pregnadiene-3,11,20-trione*

A. 6β,9α-DIBROMO-16β-METHYL-17α,21-DIHYDROXY-1,4-PREGNADIENE-3,11,20-TRIONE 21-ACETATE

The requisite intermediate, 9α-bromo-16β-methyl-17α,21-dihydroxy-1,4-pregnadiene-3,11,20-trione 21-acetate is prepared by the process of co-pending application Serial No. 733,843 of Rausser et al., filed May 8, 1958.

The 9α-bromopregnadiene intermediate is brominated and isolated in the manner of Example 1A to give 6β,9α-dibromo-16β-methyl-17α,21 - dihydroxy - 1,4-pregnadiene-3,11,20-trione 21-acetate.

B. 9α-BROMO-16β-METHYL-17α,21-DIHYDROXY-1,5-PREGNADIENE-3,11,20-TRIONE 21-ACETATE

The dibromide of Example 12a is reacted with zinc powder in aqueous ethanol in the manner of Example 1B, and the resulting product isolated and purified in the described manner to give 9α-bromo-16β-methyl-17α,21-dihydroxy-1,5-pregnadiene-3,11,20-trione 21-acetate.

C. 9α-BROMO-16β-METHYL-17α,21-DIHYDROXY-1,5-PREGNADIENE-3,11,20-TRIONE

The 21-acetate of Example 12B is hydrolyzed to the corresponding alcohol with the aid of a culture of *Flavobacterium dehydrogenans* to yield 9α-bromo-16β-methyl-17α,21-dihydroxy-1,5-pregnadiene-3,11,20-trione.

EXAMPLE 13

*16α - methyl - 11β,17α,21 - trihydroxy - 1,5 - pregnadiene-3,20-dione*

6β-BROMO-16α-METHYL-11β,17α,21-TRIHYDROXY-1,4-PREGNADIENE-3,20-DIONE 21-ACETATE

The requisite intermediate, 16α-methyl-11β,17α,21-trihydroxy-1,4-pregnadiene-3,20-dione 21-acetate, is prepared by the process of co-pending application Serial No. 733,843 of Rausser et al., filed May 8, 1958.

The 16α-methyl-1,4-pregnadiene intermediate is brominated and the resulting product isolated in the manner of Example 1A to give 6β-bromo-16α-methyl-11β,17α,21-trihydroxy-1,4-pregnadiene-3,20-dione 21-acetate.

B. 16α-METHYL-11β,17α,21-TRIHYDROXY-1,5-PREGNADIENE-3,20-DIONE 21-ACETATE

The 6β-bromo-1,4-pregnadiene of Example 13A (500 mg.) is dissolved in 150 ml. of absolute ethanol, then 25 ml. of water and 5 g. of zinc powder are added. The suspension is stirred at room temperature for 8 hours, after which time the zinc is filtered. The filtrate is concentrated in vacuo to a residue which is crystallized from acetone to give 16α-methyl-11β,17α,21-trihydroxy-1,5-pregnadiene-3,20-dione 21-acetate.

Alternatively, the compound of this example is prepared from the 6β-bromo-1,4-pregnadiene of Example 13A with zinc in ethanol by the procedure of Example 1B.

C. 16α-METHYL-11β,17α,21-TRIHYDROXY-1,5-PREGNADIENE-3,20-DIONE

The 21-acetate of above Example 13B is hydrolyzed to the corresponding 21-alcohol with the aid of a culture of *Flavobacterium dehydrogenans* in the manner of Example 2 to give 16α-methyl-11β,17α,21-trihydroxy-1,5-pregnadiene-3,20-dione.

Alternatively, the product of this example may be prepared from 6β-bromo-16α-methyl-11β,17α,21-trihydroxy-1,4-pregnadiene-3,20-dione 21-acetate by the alternative process of Example 4.

EXAMPLE 14

*16β-methyl-11β,17α,21-trihydroxy-1,5-pregnadiene-3,20-dione*

A. 6β-BROMO-16β-METHYL-11β,17α,21-TRIHYDROXY-1,4-PREGNADIENE-3,20-DIONE 21-ACETATE

The requisite intermediate, 16β-methyl-11β,17α,21-trihydroxy-1,4-pregnadiene-3,20-dione 21-acetate, is prepared according to the process of co-pending application Serial No. 733,843 of Rausser et al., filed May 8, 1958.

This 16β-methyl-1,4-pregnadiene intermediate is brominated, and the resulting product isolated and purified in the manner of Example 1A to give 6β-bromo-16β-methyl - 11β,17α,21 - trihydroxy - 1,4 - pregnadiene - 3,20-dione 21-acetate.

B. 16β-METHYL-11β,17α,21-TRIHYDROXY-1,5-PREGNADIENE-3,20-DIONE 21-ACETATE

The 6β-bromo-1,4-pregnadiene of Example 14A is reacted with zinc powder in aqueous ethanol in the manner of Example 13B, and the resulting product isolated and purified in the described manner to give 16β-methyl-11β,17α,21-trihydroxy-1,5-pregnadiene-3,20-dione 21-acetate.

C. 16β-METHYL-11β,17α,21-TRIHYDROXY-1,5-PREGNADIENE-3,20-DIONE

The 21-acetate of Example 14B is hydrolyzed to the corresponding 21-alcohol with the aid of a culture of *Flavobacterium dehydrogenans* in the manner described in Example 2 to give 16β-methyl-11β,17α,21-trihydroxy-1,5-pregnadiene-3,20-dione.

Alternatively, the compound of this example may be prepared from 6β-bromo - 16β - methyl-11β,17α,21-trihydroxy-1,4-pregnadiene-3,20-dione 21-acetate (the compound of Example 14A) by the alternative process of Example 4.

EXAMPLE 15

*16α-methyl-17α,21-dihydroxy-1,5-pregnadiene-3,11,20-trione*

A. 6β-BROMO-16α-METHYL-17α,21-DIHYDROXY-1,4-PREGNADIENE-3,11,20-TRIONE 21-ACETATE

The requisite intermediate, 16α-methyl-17α,21-dihydroxy-1,4-pregnadiene-3,11,20-trione 21-acetate, is prepared according to the process of co-pending application Serial No. 733,843 of Rausser et al., filed May 8, 1958.

This 16α-methyl-1,4-pregnadiene intermediate is brominated and the resulting product isolated in the manner of Example 1A to give 6β-bromo-16α-methyl-17α,21-dihydroxy-1,4-pregnadiene-3,11,20-trione 21-acetate.

B. 16α-METHYL-17α,21-DIHYDROXY-1,5-PREGNADIENE-3,11,20-TRIONE 21-ACETATE

The 6β-bromo-1,4-pregnadiene of Example 15A is reacted with zinc powder in aqueous ethanol in the manner of Example 13B, and the resulting product isolated and purified in the described manner to give 16α-methyl-17α,21-dihydroxy-1,5-pregnadiene-3,11,20-trione 21-acetate.

C. 16α-METHYL-17α,21-DIHYDROXY-1,5-PREGNADIENE-3,11,20-TRIONE

The 21-acetate of Example 15B is hydrolyzed to the corresponding 21-alcohol with the aid of a culture of *Flavobacterium dehydrogenans* in the manner described in Example 2 to give 16α-methyl-17α,21-dihydroxy-1,5-pregnadiene-3,11,20-trione.

Alternatively, the compound of this example may be prepared from 6β-bromo-16α-methyl-17α,21-dihydroxy-1,4-pregnadiene-3,11,20-trione 21-acetate (the compound of Example 15A) by the alternative process of Example 4.

EXAMPLE 16

*16β-methyl-17α,21-dihydroxy-1,5-pregnadiene-3,11,20-trione*

A. 6β-BROMO-16β-METHYL-17α,21-DIHYDROXY-1,4-PREGNADIENE-3,11,20-TRIONE 21-ACETATE

The requisite intermediate, 16β-methyl-17α,21-dihydroxy-1,4-pregnadiene-3,11,20-trione 21-acetate is prepared according to the process of co-pending application Serial No. 733,843 of Rausser et al., filed May 8, 1958.

This 16β-methyl-1,4-pregnadiene intermediate is brominated and the resulting product isolated in the manner of Example 1A to give 6β-bromo-16β-methyl-17α,21-dihydroxy-1,4-pregnadiene-3,11,20-trione 21-acetate.

B. 16β-METHYL-17α,21-DIHYDROXY-1,5-PREGNADIENE-3,11,20-TRIONE 21-ACETATE

The 6β-bromo-1,4-pregnadiene of Example 16A is reacted with a zinc powder in aqueous ethanol in the manner of Example 13B, and the resulting product isolated and purified in the described manner to give 16β-methyl-17α,21-dihydroxy-1,5-pregnadiene - 3,11,20 - trione 21-acetate.

C. 16β-METHYL-17α,21-DIHYDROXY-1,5-PREGNADIENE-3,11,20-TRIONE

The 21-acetate of Example 16B is hydrolyzed to the corresponding 21-alcohol with the aid of a culture of *Flavobacterium dehydrogenans* in the manner described in Example 2 to give 16β-methyl-17α,21-dihydroxy-1,5-pregnadiene-3,11,20-trione.

Alternatively, the compound of this example may be prepared from 6β-bromo-16β-methyl-17α,21-dihydroxy-1,4-pregnadiene-3,11,20-trione 21-acetate (the compound of Example 16A) by the alternative process of Example 4.

EXAMPLE 17

*16α-ethyl-17α,21-dihydroxy-1,5-pregnadiene-3,11,20-trione*

A. 6β-BROMO-16α-ETHYL-17α,21-DIHYDROXY-1,4-PREGNADIENE-3,11,20-TRIONE 21-ACETATE

The requisite intermediate, 16α-ethyl-17α,21-dihydroxy-1,4-pregnadiene-3,11,20-trione 21-acetate is prepared according to the process of co-pending application Serial No. 733,843 of Rausser et al., filed May 8, 1958.

This 16α-ethyl-1,4-pregnadiene intermediate is brominated and the resulting product isolated in the manner of Example 1A to give 6β-bromo-16α-ethyl-17α,21-dihydroxy-1,4-pregnadiene-3,11,20-trione 21-acetate.

B. 16α-ETHYL-17α,21-DIHYDROXY-1,5-PREGNADIENE-3,11,20-TRIONE 21-ACETATE

The 6β-bromo-1,4-pregnadiene of Example 17A is reacted with a zinc powder in aqueous ethanol in the manner of Example 1B, and the resulting product isolated and purified in the described manner to give 16α-ethyl-17α,21-dihydroxy-1,5-pregnadiene-3,11,20-trione 21-acetate.

C. 16α-ETHYL-17α,21-DIHYDROXY-1,5-PREGNADIENE-3,11,20-TRIONE

The 21-acetate of Example 17B is hydrolyzed to the corresponding 21-alcohol with the aid of a culture of *Flavobacterium dehydrogenans* in the manner described in Example 2 to give 16α-ethyl-17α,21-dihydroxy-1,5-pregnadiene-3,11,20-trione.

Alternatively the compound of this example may be prepared from 6β-bromo-16α-ethyl-17α,21-dihydroxy-1,4-pregnadiene-3,11,20-trione 21-acetate (the compound of Example 17A) by the alternative process of Example 4.

EXAMPLE 18

*16α-ethyl-11β,17α,21-trihydroxy-1,5-pregnadiene-3,20-dione*

A. 6β-BROMO-16α-ETHYL-11β,17α,21-TRIHYDROXY-1,4-PREGNADIENE-3,20-DIONE 21-ACETATE

The requisite intermediate, 16α-ethyl-11β,17α,21-trihydroxy-1,4-pregnadiene-3,20-dione 21-acetate, is prepared according to the process of co-pending application Serial No. 733,843 of Rausser et al., filed May 8, 1958.

This 16α-ethyl-1,4-pregnadiene intermediate is brominated and the resulting product isolated in the manner of Example 1A to give 6β-bromo-16α-ethyl-11β,17α,21-trihydroxy-1,4-pregnadiene-3,20-dione 21-acetate.

B. 16α-ETHYL-11β,17α,21-TRIHYDROXY-1,5-PREGNADIENE-3,20-DIONE 21-ACETATE

The 6β-bromo-1,4-pregnadiene of Example 18A is reacted with a zinc powder in aqueous ethanol in the manner of Example 1B, and the resulting product isolated and purified in the described manner to give 16α-ethyl-11β,17α,21-trihydroxy-1,5-pregnadiene-3,20-dione 21-acetate.

C. 16α-ETHYL-11β,17α,21-TRIHYDROXY-1,5-PREGNADIENE-3,20-DIONE

The 21-acetate of Example 18B is hydrolyzed to the corresponding 21-alcohol with the aid of a culture of *Flavobacterium dehydrogenans* in the manner described in Example 2 to give 16α-ethyl-11β,17α,21-trihydroxy-1,5-pregnadiene-3,20-dione.

Alternatively, the compound of this example may be prepared from 6β-bromo-16α-ethyl-11β,17α,21-trihydroxy-1,4-pregnadiene-3,20-dione 21-acetate (the compound of Example 18A) by the alternative process of Example 4.

EXAMPLE 19

*9α-bromo-16α-ethyl-11β,17α,21-trihydroxy-1,5-pregnadiene-3,20-dione*

A. 6β,9α-DIBROMO-16α-ETHYL,11β,17α,21-TRIHYDROXY-1,4-PREGNADIENE-3,20-DIONE 21-ACETATE

The requisite intermediate, 9α-bromo-16α-ethyl-11β,17α,21-trihydroxy-1,4-pregnadiene-3,20-dione 21-acetate, is prepared according to the process of co-pending application Serial No. 733,843 of Rausser et al., filed May 8, 1958.

This 9α-bromo-16α-ethyl-1,4-pregnadiene- intermediate, is brominated and the resulting product isolated in the manner of Example 1A to give 6β,9α-dibromo-16α-ethyl-11β,17α,21-trihydroxy-1,4-pregnadiene-3,20-dione 21-acetate.

B. 9α-BROMO-16α-ETHYL-11β,17α,21-TRIHYDROXY-1,5-PREGNADIENE-3,20-DIONE 21-ACETATE

The 6β-bromo-1,4-pregnadiene of Example 19A is reacted with a zinc powder in aqueous ethanol in the manner of Example 1B, and the resulting product isolated and purified in the described manner to give 9α-bromo-16α-ethyl-11β,17α,21-trihydroxy-1,5-pregnadiene - 3,20 - dione 21-acetate.

C. 9α-BROMO-16α-ETHYL-11β,17α,21-TRIHYDROXY-1,5-PREGNADIENE-3,20-DIONE

The 21-acetate of Example 19B is hydrolyzed to the corresponding 21-alcohol with the aid of a culture of *Flavobacterium dehydrogenans* in the manner described in Example 2 to give 9α-bromo-16α-ethyl-11β,17α,21-trihydroxy-1,5-pregnadiene-3,20-dione.

Alternatively, the compound of this example may be prepared from 6β,9α-dibromo-16α-ethyl-11β,17α,21-trihydroxy-1,4-pregnadiene-3,20-dione 21-acetate (the compound of Example 19A) by the alternative process of Example 4.

EXAMPLE 20

*9α-fluoro-16α-ethyl-11β,17α,21-trihydroxy-1,5-pregnadiene-3,20-dione*

A. 6β-BROMO-9α-FLUORO-16α-ETHYL-11β,17α,21-TRIHYDROXY-1,4-PREGNADIENE-3,20-DIONE 21-ACETATE

The requisite intermediate, 9α-fluoro-16α-ethyl-11β,17α, 21-trihydroxy-1,4-pregnadiene-3,20-dione 21-acetate, is prepared according to the process of co-pending application Serial No. 733,843 of Rausser et al., filed May 8, 1958.

This 9α-fluoro-16α-ethyl-1,4-pregnadiene intermediate is brominated and the resulting product isolated in the manner of Example 1A to give 6β-bromo-9α-fluoro-16α-ethyl-11β,17α,21-trihydroxy-1,4-pregnadiene - 3,20 - dione 21-acetate.

B. 9α-FLUORO-16α-ETHYL-11β,17α,21-TRIHYDROXY-1,5-PREGNADIENE-3,20-DIONE 21-ACETATE

The 6β-bromo-9α-fluoro-1,4-pregnadiene of Example 20A is reacted with zinc powder in aqueous ethanol in the manner of Example 1B, and the resulting product isolated and purified in the described manner to give 9α-fluoro-16α-ethyl-11β,17α,21-trihydroxy-1,5-pregnadiene - 3,20 - dione 21-acetate.

C. 9α-FLUORO-16α-ETHYL-11β,17α,21-TRIHYDROXY-1,5-PREGNADIENE-3,20-DIONE

The 21-acetate of Example 20B is hydrolyzed to the corresponding 21-alcohol with the aid of a culture of *Flavobacterium dehydrogenans* in the manner described in Example 2 to give 9α-fluoro-16α-ethyl-11β,17α,21-trihydroxy-1,5-pregnadiene-3,20-dione.

Alternatively, the compound of this example may be prepared from 6β-bromo-9α-fluoro-16α-ethyl-11β,17α,21-trihydroxy-1,4-pregnadiene - 3,20 - dione 21-acetate (the compound of Example 20A) by the alternative process of Example 4.

EXAMPLE 21

*9α-fluoro-16α-ethyl-17α,21-dihydroxy-1,5-pregnadiene-3, 11,20-trione*

A. 6β-BROMO-9α-FLUORO-16α-ETHYL-17α,21-DIHYDROXY-1,4-PREGNADIENE-3,11,20-TRIONE 21-ACETATE

The requisite intermediate, 9α-fluoro-16α-ethyl-17α,21-dihydroxy-1,4-pregnadiene-3,11,20-trione 21-acetate, is prepared according to the process of co-pending application Serial No. 733,843, of Rausser et al., filed May 8, 1958.

This 9α-fluoro-16α-ethyl-1,4-pregnadiene- intermediate is brominated and the resulting product isolated in the manner of Example 1A to give 6β-bromo-9α-fluoro-16α-ethyl-17α,21-dihydroxy-1,4-pregnadiene-3,11,20-trione 21-acetate.

B. 9α-FLUORO-16α-ETHYL-17α,21-DIHYDROXY-1,5-PREGNADIENE-3,11,20-TRIONE 21-ACETATE

The 6β-bromo-9α-fluoro-1,4-pregnadiene of Example 21A is reacted with zinc powder in aqueous ethanol in the manner of Example 1B, and the resulting product isolated and purified in the described manner to give 9α-fluoro-16α-ethyl-17α,21-dihydroxy-1,5-pregnadiene - 3,11,20-trione 21-acetate.

C. 9α-FLUORO-16α-ETHYL-17α,21-DIHYDROXY-1,5-PREGNADIENE-3,11,20-TRIONE

The 21-acetate of Example 21B is hydrolyzed to the corresponding 21-alcohol with the aid of a culture of *Flavobacterium dehydrogenans* in the manner described in Example 2 to give 9α-fluoro-16α-ethyl-17α,21-dihydroxy-1,5-pregnadiene-3,11,20-trione.

Alternatively, the compound of this example may be prepared from 6β-bromo-9α-fluoro-16α-ethyl-17α,21-dihydroxy-1,4-pregnadiene-3,11,20-trione 21-acetate (the compound of Example 21A) by the alternative process of Example 4.

EXAMPLE 22

*16α-n-butyl-17α,21-dihydroxy-1,5-pregnadiene-3,11,20-trione*

A. 6β-BROMO-16α-N-BUTYL-17α,21-DIHYDROXY-1,4-PREGNADIENE-3,11,20-TRIONE 21-ACETATE

The requisite intermediate, 16α-n-butyl-17α,21-dihydroxy-1,4-pregnadiene-3,11,20-trione 21-acetate, is derived from 16α-n-butylcortisone 21-acetate, which, in turn, is prepared according to the process of co-pending application Serial No. 733,843 of Rausser et al., filed May 8, 1958. 16α-n-butylcortisone 21-acetate is subjected to the action of a culture of *Corynebacterium simplex* (A.T.C.C. 6946) in the manner disclosed in U.S. Patent No. 2,837,464, and the resulting reaction mixture extracted with chloroform in the described manner. The chloroform extracts are combined and concentrated to a residue which, after crystallization from acetone, gives 16α-n-butyl-17α, 21-dihydroxy-1,4-pregnadiene-3,11,20-trione 21-acetate.

16α-n-butyl-17α,21-dihydroxy-1,4-pregnadiene - 3,11,20-trione 21-acetate is brominated and the resulting product isolated in the manner of Example 1A to give 6β-bromo-16α-n-butyl-17α,21-dihydroxy-1,4-pregnadiene-3,11,20-trione 21-acetate.

B. 16α-N-BUTYL-17α,21-DIHYDROXY-1,5-PREGNADIENE-3,11,20-TRIONE 21-ACETATE

The 6β-bromo-16α-n-butyl-1,4-pregnadiene of above Example 22A is reacted with zinc in aqueous ethanol in the manner of Example 1B and the resulting product isolated and purified in the described manner to give 16α-n-butyl-17α,21-dihydroxy-1,5-pregnadiene-3,11,20-trione 21-acetate.

C. 16α-N-BUTYL-17α,21-DIHYDROXY-1,5-PREGNADIENE-3,11,20-TRIONE

The 21-acetate of above Example 22B is hydrolyzed to corresponding 21-alcohol with the aid of a culture of *Flavobacterium dehydrogenans* by the procedure described in Example 2.

Alternatively, the compound of this example may be prepared from 6β-bromo-16α-n-butyl-17α,21-dihydroxy-1,4-pregnadiene-3,11,20-trione 21-acetate (the compound of Example 22B) by the alternative process of Example 4.

EXAMPLE 23

*16β-n-butyl-17α,21-dihydroxy-1,5-pregnadiene-3,11,20-trione*

The requisite intermediate, 16β-n-butyl-17α,21-dihydroxy-1,4-pregnadiene-3,11,20-trione 21-acetate, is derived from 16β-n-butylcortisone 21-acetate which is prepared by the process of co-pending application Serial No. 733,843 of Rausser et al., filed May 8, 1958. When subjected to the action of a culture of *Corynebacterium simplex* in the manner disclosed in U.S. Patent No. 2,837,464, and the resulting product isolated and purified as described in Example 22A, 16β-n-butylcortisone 21-acetate is converted to 16β-n-butyl-17α,21-dihydroxy1,4-pregnadiene-3,11,20-trione 21-acetate.

In the manner of Example 22, 16β-n-butyl-17α,21-dihydroxy-1,4-pregnadiene-3,11,20-trione 21-acetate is brominated to the corresponding 6β-bromo-derivative which, in turn, is reacted with zinc in aqueous ethanol to give 16β-n-butyl - 17α,21 - dihydroxy-1,5-pregnadiene-3,11,20-trione 21-acetate.

The 21-acetate is then hydrolyzed to the 21-alcohol in the described manner to give 16β-n-butyl-17α,21-dihydroxy-1,5-pregnadiene-3,11,20-trione.

EXAMPLE 24

*16α-methyl-17α,21-dihydroxy-1,5-pregnadiene-3,11,20-trione 21-n-propionate*

To one gram of 16α-methyl-17α,21-dihydroxy-1,5-pregnadiene-3,11,20-trione, the compound of Example 15, there is added 0.5 ml. of n-propionic anhydride in 2.3 ml. of pyridine. After standing for one hour at room temperature, the mixture is poured into ice and hydrochloric acid. The resulting precipitate is filtered and recrystallized from aqueous methanol to yield 16α-methyl-17α,21-dihydroxy-1,5-pregnadiene-3,11,20-trione 21-n-propionate.

Similarly, any one of the 21-hydroxy-1,5-pregnadiene compounds of our invention may be treated with propionic anhydride in the above described manner to yield the corresponding 21-n-propionate ester.

By substituting anhydrides of other lower alkanoic acids, such as acetic, butyric, valeric and the like, for propionic anhydride in the procedure of Example 24, there may be obtained the corresponding 21-lower alkanoate of any 16-alkyl-1,5-pregnadiene-21-hydroxy starting compound.

EXAMPLE 25

*16α-methyl-17α,21-dihydroxy-1,5-pregnadiene-3,11,20-trione*

A. 16α-METHYL 6β,17α,21-TRIHYDROXY-1,4-PREGNADIENE-3,11,20-TRIONE

The requisite intermediate, 16α - methyl - 17α,21 - dihydroxy-1,4-pregnadiene-3,11,20-trione, is prepared as described in copending application Serial No. 733,843 of Rausser et al., filed May 8, 1958.

Into each of ten 300 ml. Erlenmeyer flasks is placed 100 ml. of a growth medium having the following composition:

| | G. |
|---|---|
| Difco yeast extract | 3–10 |
| Corn steep liquor | 1 |
| Dextrose | 10 |

Distilled or tap water, q.s. to one liter.

Each flask is inoculated with spores from an agar medium culture of *Chaetomium funicolum* (QM No. 33C) or with a 1–10% submerged inoculum which has been grown for 24–48 hours. The mixture is incubated by shaking the flasks on a rotary shaker for 24–48 hours at 28° C. at approximately 250 r.p.m. To each of the flasks (now showing prolific growth) is added, aseptically, 50 mg. of 16α-methyl-17α,21-dihydroxy-1,4-pregnadiene-3,11,20-trione in 2 ml. of ethanol. The fermentation mixture is then incubated and shaken for 24–72 hours at 28° C. after which time complete conversion occurs. The mixture is extracted thoroughly with chloroform and the small fraction of the product which is retained within the mycelium is extracted by boiling the mycelium in chloroform for a few minutes. The chloroform extracts are combined and evaporated to a residue yielding approximately 5 mg. of crude material. The residue is triturated with methanol affording a crystalline solid which is purified by crystallization from acetone yielding 16α - methyl - 6β,17α,21 - trihydroxy-1,4-pregnadiene-3,11,20-trione.

B. 16α-METHYL-6β,17α,21-TRIHYDROXY-1,4-PREGNADIENE-3,11,20-TRIONE 21-ACETATE

A solution of 25 mg. of the compound of Example 25A in 2 ml. of anhydrous pyridine is poured into 6 ml. of acetic anhydride in a nitrogen atmosphere. The mixture is stirred for 30 minutes and then poured into dilute sulfuric acid and ice. The resultant precipitate is removed by filtration, dried and crystallized from methanol, yielding 16α - methyl - 6β,17α,21 - trihydroxy-1,4-pregnadiene-3,11,20-trione 21-acetate.

C. 16α - METHYL - 6β,17α,21 - TRIHYDROXY - 1,4 - PREGNADIENE - 3,11,20 - TRIONE 6-METHANESULFONATE 21-ACETATE 100 mg. of 16α-methyl-6β,17α,21-trihydroxy-1,4-pregnadiene-3,11,20-trione 21-acetate, is prepared as in Example 25B, is dissolved in 0.4 ml. of methylene chloride and 0.4 ml. of pyridine. The solution is cooled to 0° C., 1.6 ml. of methanesulfonyl chloride added, and the mixture stirred for 2 hours at 0° C. then left overnight at room temperature. The reaction mixture is then poured into water, the resulting precipitate which is filtered and air dried is 16α-methyl-6β,17α,21-trihydroxy-1,4-pregnadiene-3,11,20-trione 6-methanesulfonate 21-acetate.

D. 16α-METHYL-17α,21-DIHYDROXY-1,5-PREGNADIENE-3,11,20-TRIONE 21-ACETATE

The 6 - methanesulfonate - 16α-methyl-1,4-pregnadiene (55 mg.) of above Example 25C is dissolved in 20 ml. of ethanol and 1 ml. of water. Zinc fillings (100 mg.) are added, and the suspension stirred for 1 hour at 90° C. The solution is cooled, the zinc filtered, and the resulting filtrate concentrated to a residue of substantially 16α-methyl-17α,21-dihydroxy - 1,5-pregnadiene-3,11,20-trione 21-acetate.

E. 16α-METHYL-17α,21-DIHYDROXY-1,5-PREGNADIENE-3,11,20-TRIONE

The 21-acetate of Example 25D is hydrolyzed to the corresponding 21-alcohol in the manner described in Example 2 to give 16α-methyl-17α,21-dihydroxy-1,5-pregnadiene-3,11,20-trione.

Alternatively, the compound of this example may be prepared as described in following procedures F and G.

F. 16α - METHYL - 6β,17α,21 - TRIHYDROXY - 1,4 - PREGNADIENE-3,11,20-TRIONE 6β,21-DIACETATE

A solution of 25 mg. of the compound of Example 25A in 2 ml. of anhydrous pyridine is poured onto 100 mg. of acetic anhydride in an anhydrous atmosphere. The mixture is stirred for 30 minutes and then poured into dilute sulfuric acid and ice. The resultant precipitate is removed by filtration, dried and crystallized from methanol, yielding 16α - methyl - 6β,17α,21 - trihydroxy - 1,4 - pregnadiene-3,11,20-trione 6β,21-diacetate.

G. 16α-METHYL-17α,21-DIHYDROXY-1,5-PREGNADIENE-3,11,20-TRIONE 21-ACETATE

The 6β,21-diacetate of Example 25F is reacted with zinc and alcohol in the manner described in Example 25D to give 16α - methyl - 17α,21-dihydroxy-1,5-pregnadiene-3,11,20-trione 21-acetate.

The 21-acetate of this example is converted to the corresponding 21-hydroxy-1,5-pregnadiene in the manner of Example 2.

A third alternative process is described in following procedures H and I.

H. 16α - METHYL - 6β,17α,21 - TRIHYDROXY -1,4 - PREGNADIENE-3,11,20-TRIONE 6β-p-TOLUENESULFONATE 21-ACETATE

A solution of 100 mg. of the product of Example 25B in 2 ml. of anhydrous pyridine is treated with 100 mg. of p-toluenesulfonyl chloride and the mixture is stirred for 1 hour. The solution is poured into aqueous sulfuric acid and ice, and the resulting precipitate is removed by filtration, washed with water, dried, and crystallized from acetone-hexane to give 16α-methyl-6β,17α,21-trihydroxy-1,4 - pregnadiene - 3,11,20 - trione 6β - p-toluenesulfonate 21-acetate.

I. 16α-METHYL-17α,21-DIHYDROXY-1,5-PREGNADIENE-3,11,20-TRIONE 21-ACETATE

The 6-p-toluenesulfonate 21-acetate-1,4-pregnadiene of above Example 25H is reacted with zinc powder in the manner described in Example 13B to give 16α-methyl-17α,21 - dihydroxy - 1,5 - pregnadiene - 3,11,20 - trione 21-acetate.

The 21-acetate of the 16α-methyl-1,5-pregnadiene prepared above is hydrolyzed to the corresponding 21-hydroxy compound in the manner described in Example 2.

EXAMPLE 26

*9α-bromo-16α-ethyl-17α,21-dihydroxy-1,5-pregnadiene-3,11,20-trione*

A. 9α - BROMO - 16α - ETHYL - 17α,21 - DIHYDROXY - 1,4-PREGNADIENE-3,11,20-TRIONE 21-ACETATE

The requisite intermediate, 9α-bromo-16α-ethyl-11β,17α,21-trihydroxy-1,4-pregnadiene-3,20-dione 21-acetate, is prepared as described in co-pending application Serial No. 733,843 of Rausser et al., filed May 8, 1958.

To a solution of 0.3 g. of 9α-bromo-16α-ethyl-17α,21-dihydroxy-1,5-pregnadiene-3,20-dione 21-acetate in 15 ml. of acetic acid, there is added dropwise a solution of 60 mg. of chromium trioxide in 1 ml. of water and 3 ml. of acetic acid. The resultant mixture is allowed to stand for 5 hours, then is diluted with water, and extracted with methylene chloride. The organic extracts are washed with water, dried over magnesium sulfate, filtered and evaporated to a residue which is crystallized from methanol to give 9α-bromo-16α-ethyl-17α,21-dihydroxy-1,4-pregnadiene-3,11,20-trione 21-acetate.

B. 6β,9α - DIBROMO - 16α - ETHYL - 17α,21 - DIHYDROXY-1,4-PREGNADIENE-3,11,20-TRIONE 21-ACETATE

The 9α-bromo-16α-ethyl-1,4-pregnadiene of Example 26A is brominated and the resultant product isolated in the manner described in Example 1A to give 6β,9α-dibromo - 16α-ethyl-17α,21-dihydroxy-1,4-pregnadiene-3,11, 20-trione 21-acetate.

C. 9α - BROMO - 16α - ETHYL - 17α,21 - DIHYDROXY - 1,5 - PRAGNADIENE-3,11,20-TRIONE 21-ACETATE

6β,9α - dibromo - 16α-ethyl-17α,21-dihydroxy-1,4-pregnadiene-3,11,20-trione 21-acetate (500 mg.) is dissolved in 10 ml. of tetrahydrofuran, and 4 g. of magnesium turnings added. This mixture is stirred at room temperature for one hour, then 25 ml. of 5% aqueous ammonium sulfate solution is added. This mixture is stirred another hour, then chloroform is added and the organic solvent layer is separated from the aqueous layer. The chloroform solution is concentrated in vacuo to yield 9α-bromo-16α - ethyl - 17α,21-dihydroxy-1,5-pregnadiene-3,11,20-trione 21-acetate.

D. 9α - BROMO - 16α - ETHYL - 17α,21 - DIHYDROXY - 1,5 - PREGNADIENE-3,11,20-TRIONE

The 21-acetate of Example 26C is hydrolyzed to the corresponding 21-alcohol with the aid of a culture of *Flavobacterium dehydrogenans* to yield 9α-bromo-16α-ethyl-17α,21-dihydroxy-1,5-pregnadiene-3,11,20-trione.

We claim:
1. 6β-bromo-1,4-pregnadienes of the following formula:

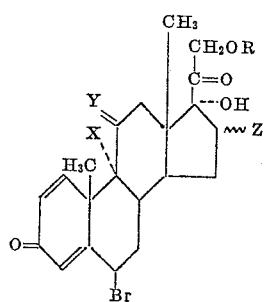

wherein X is a member of the group consisting of H and a halogen having an atomic weight less than 126; Y is a member of the group consisting of O and (H, βOH); Z is a lower alkyl radical; and R is lower alkanoyl.

2. 6β-bromo-1,4-pregnadienes having the formula:

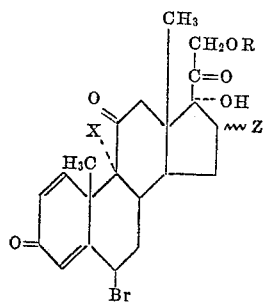

wherein X is a halogen of atomic weight less than 126, Z is a lower alkyl, and R is lower alkanoyl.

3. 6β-bromo-1,4-pregnadienes having the formula:

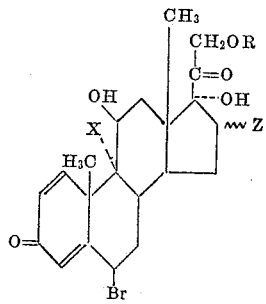

wherein X is a halogen of atomic weight less than 126, Z is lower alkyl, and R is lower alkanoyl.

4. 6β-bromo-1,4-pregnadienes of the formula:

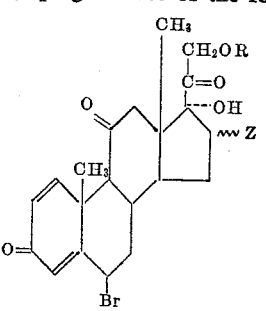

wherein Z is lower alkyl and R is lower alkanoyl.

5. 6β-bromo-1,4-pregnadienes of the formula:

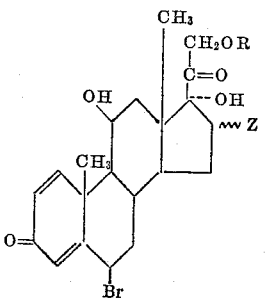

wherein Z is lower alkyl, and R is lower alkanoyl.

6. 6β - bromo - 9α-fluoro-16-methyl-17α,21-dihydroxy-1,4-pregnadiene-3,11,20-trione 21-acetate.

7. 6β - bromo-16-methyl-17α,21-dihydroxy-1,4-pregnadiene-3,11,20-trione 21-acetate.

8. 6β - bromo - 9α-fluoro-16-methyl-11β,17α,21-trihydroxy-1,4-pregnadiene-3,20-dione 21-acetate.

9. 6β-bromo-16-methyl-11β,17α,21-trihydroxy-1,4-pregnadiene-3,20-dione 21-acetate.

References Cited in the file of this patent
UNITED STATES PATENTS

| | | |
|---|---|---|
| 2,816,902 | Gould et al. | Dec. 17, 1957 |
| 2,887,499 | Carvajal | May 19, 1959 |
| 2,908,696 | Nussbaum et al. | Oct. 13, 1959 |

OTHER REFERENCES

Arth et al.: 80, J.A.C.S., 3161–62 (1958).
Oliveto et al.: 80, J.A.C.S., 4428 (1958).